United States Patent [19]

Oya et al.

[11] 4,206,178
[45] Jun. 3, 1980

[54] APPARATUS FOR PURIFYING EXHAUST GASES OF INTERNAL COMBUSTION ENGINES

[75] Inventors: Hiroo Ōya, Ohta; Akio Kakinuma, Nittagun, both of Japan

[73] Assignee: Fuji Jukogyo Kabushiki Kaisha, Tokyo, Japan

[21] Appl. No.: 913,025

[22] Filed: Jun. 6, 1978

[30] Foreign Application Priority Data

Apr. 8, 1978 [JP] Japan ........................... 53-41514

[51] Int. Cl.$^2$ ..................... B01J 35/04; B01J 8/02; F01N 3/15
[52] U.S. Cl. ......................... 422/176; 422/179; 422/180
[58] Field of Search ............... 23/288 F, 288 FC; 422/179, 180, 176; 60/282, 293, 299, 301, 302

[56] References Cited

U.S. PATENT DOCUMENTS

| 3,307,920 | 3/1967 | Barnes | 23/288 F |
|---|---|---|---|
| 3,780,772 | 12/1973 | Carnahan et al. | 23/288 FC UX |
| 3,817,714 | 6/1974 | Wiley | 23/288 FC |
| 3,841,842 | 10/1974 | Wiley | 23/288 FC |
| 3,854,888 | 12/1974 | Frietzsche et al. | 23/288 FC |
| 3,912,459 | 10/1975 | Kearsley | 422/179 |
| 3,938,959 | 2/1976 | Matsui et al. | 23/288 FC |
| 3,978,567 | 9/1976 | Vroman | 23/288 FC X |
| 4,002,433 | 1/1977 | Oser | 23/288 FC |
| 4,043,761 | 8/1977 | Gaysert et al. | 23/288 FC |

FOREIGN PATENT DOCUMENTS

| 968970 | 6/1975 | Canada | 60/299 |
|---|---|---|---|
| 2311475 | 10/1973 | Fed. Rep. of Germany | 23/288 FC |
| 2341527 | 3/1974 | Fed. Rep. of Germany | 23/288 FC |
| 2307215 | 8/1974 | Fed. Rep. of Germany | 23/288 FC |
| 2308721 | 8/1974 | Fed. Rep. of Germany | 422/180 |
| 2412863 | 10/1974 | Fed. Rep. of Germany | 23/288 FC |
| 2341265 | 3/1975 | Fed. Rep. of Germany | 23/288 FC |
| 2364425 | 7/1975 | Fed. Rep. of Germany | 23/288 FC |
| 2604886 | 8/1977 | Fed. Rep. of Germany | 23/288 FC |
| 1357241 | 6/1974 | United Kingdom | 60/302 |
| 1437315 | 5/1976 | United Kingdom | 23/288 FC |

*Primary Examiner*—Barry S. Richman
*Attorney, Agent, or Firm*—Martin A. Farber

[57] ABSTRACT

Apparatus for purifying the exhaust gases of internal combustion engines comprising a pair of upstream exhaust pipes, a catalytic converter, and a downstream exhaust pipe. The catalytic converter comprises a cylindrical shell having an inlet chamber, a catalyst chamber, an outlet chamber, and a monolithic catalyst element in the catalyst chamber. The inlet chamber has inlet ports communicating with the upstream exhaust pipes respectively and axial lines of the inlet ports cross each other in the inlet chamber. In the inlet chamber, a diffusion means is provided to diffuse the exhaust gas for uniformly distributing it to the catalyst element.

5 Claims, 8 Drawing Figures

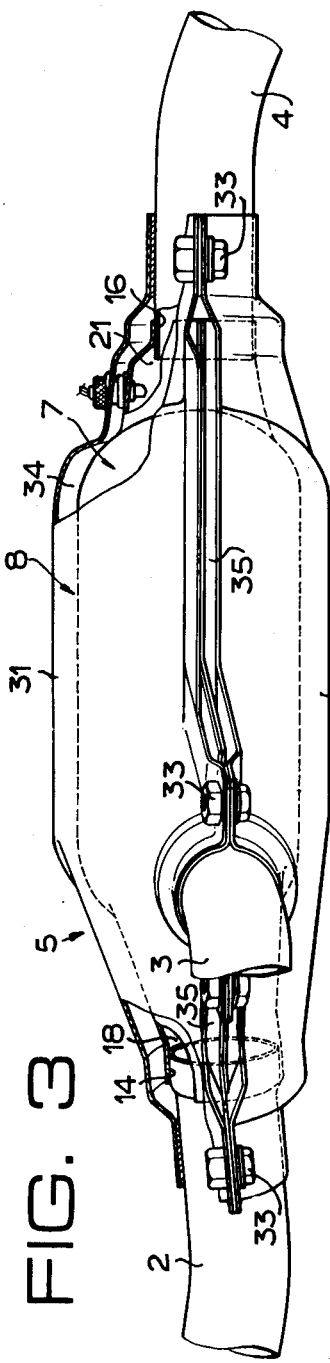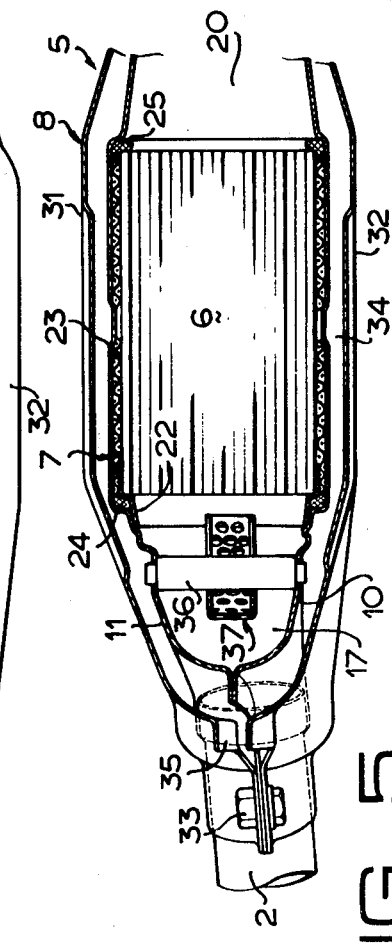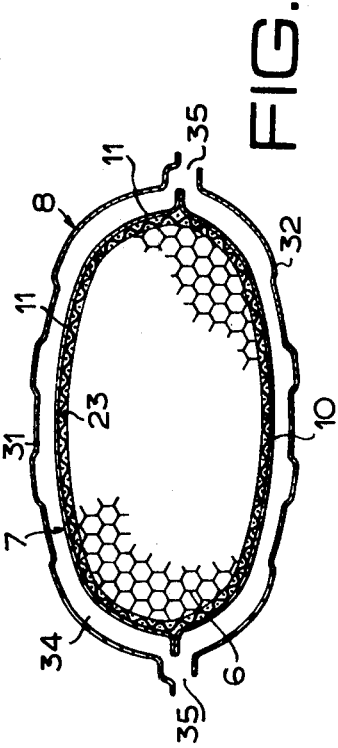

APPARATUS FOR PURIFYING EXHAUST GASES OF INTERNAL COMBUSTION ENGINES

BACKGROUND OF THE INVENTION

The present invention relates to apparatus for purifying exhaust gases of internal combustion engines of automotive vehicles.

There are three kinds of catalytic converters, namely a reducing catalytic converter for elimination of nitrogen oxides, an oxidizing catalytic converter for elimination of carbon monoxide and hydrocarbons, and three-way converters for reacting the three noxious elements at the same time. The converters comprise a catalyst bed comprising a pellet type catalyst element or monolithic or honeycomb catalyst element. The monolithic catalyst element has a series of longitudinally oriented passages, so that exhaust gases may flow smoothly through the catalyst element. However, there is a problem that reaction may not be sufficiently carried out to reduce each noxious conponent to the required level because of short residence time of the gas flow.

Further, in the conventional catalytic converter the axial line of the inlet port is arranged to make a right angle with the front plane of the catalyst element at the central portion thereof. Although the inlet port communicates the catalyst element through the cone-shaped guide duct, the exhaust gas flow cannot sufficiently diffuse up to the entire front plane of the catalyst element and hence has a tendency to collect in the central portion of the front plane. Consequently, the central portion is heated at a high temperature resulting early in damage to the portion.

Therefore, it is the object of the present invention to provide a catalytic converter which may uniformly distribute the exhaust gases to the monolithic catalyst element, thereby achieving maximum reaction efficiency.

According to the present invention, a diffuser means is provided in the inlet chamber of the catalytic converter for distributing the exhaust gases uniformly to the monolithic catalyst element.

SUMMARY OF THE INVENTION

In accordance with the present invention, the apparatus comprises a pair of upstream exhaust pipes, a catalytic converter communicating with to the exhaust pipes, and a downstream exhaust pipe communicating with to the catalytic converter. The catalytic converter comprises a cylindrical shell comprising a pair of half shells for defining an inlet chamber and a catalyst chamber and outlet chamber, the monolithic catalyst element being resiliently mounted in the catalyst chamber. The inlet chamber has two inlet ports which are communicate with to the upstream exhaust pipes, respectively, and the outlet chamber has an outlet port communicating with to the downstream exhaust pipe. The two inlet ports are disposed in such that the axial lines of the inlet ports cross each other in the inlet chamber at a portion in front of the catalyst element. A diffuser means is provided in the inlet chamber for diffusing the exhaust gases in the inlet chamber, thereby uniformly distributing the gases to the monolithic catalyst element.

Other objects and advantages will be apparent as the present invention is hereinafter described in detail referring to the accompanying drawings, in which:

FIG. 3 is a side view of the catalytic converter,

FIG. 4 is a perspective view of shells of the catalytic converter with the parts shown in disassembled relation, FIG. 5 is a sectional view taken along the line V—V in FIG. 2, FIG. 6 is a sectional view taken along the line VI—VI in FIG. 2.

DETAILED DESCRIPTION OF THE INVENTION

Figure 1:
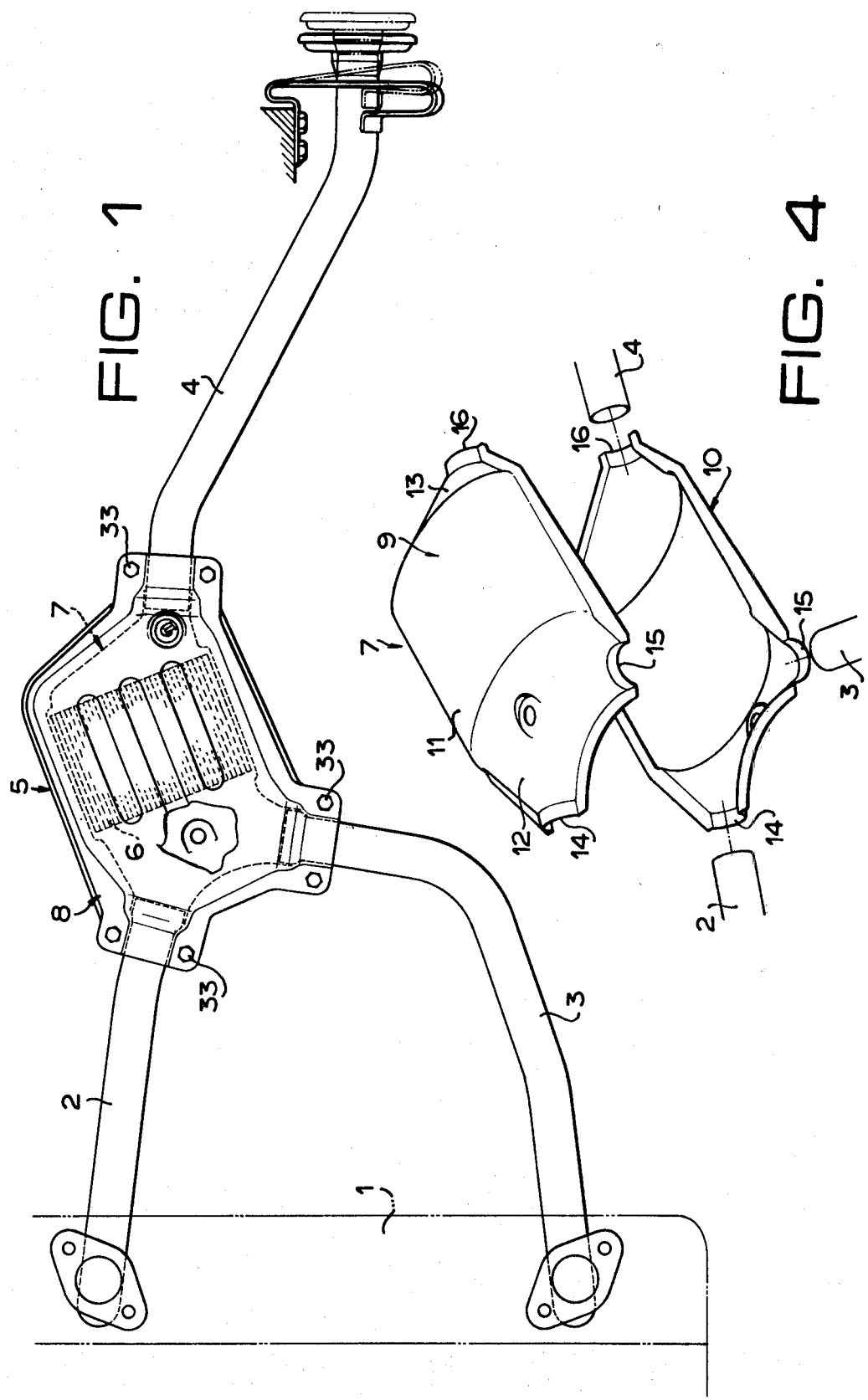
FIG. 1 is a plan view of an apparatus embodying the present invention.

Referring to FIG. 1, exhaust an system in which the catalytic converter of the present invention is applied comprises a bifurcated exhaust pipe comprising two upstream exhaust pipes 2 and 3 connected to a pair of exhaust ports of the engine 1 and a common downstream exhaust pipe 4. Such a bifurcated exhaust pipe, for example, is used in the horizontal opposed-cylinder type engine. At the concourse portion or bifurcation of the exhaust pipes, a catalytic converter 5 of the present invention is provided, connecting each end of the exhaust pipes 2 and 3 to an inlet of the catalytic converter and connecting the end of the common exhaust pipe 4 to an outlet thereof.

Figure 2:
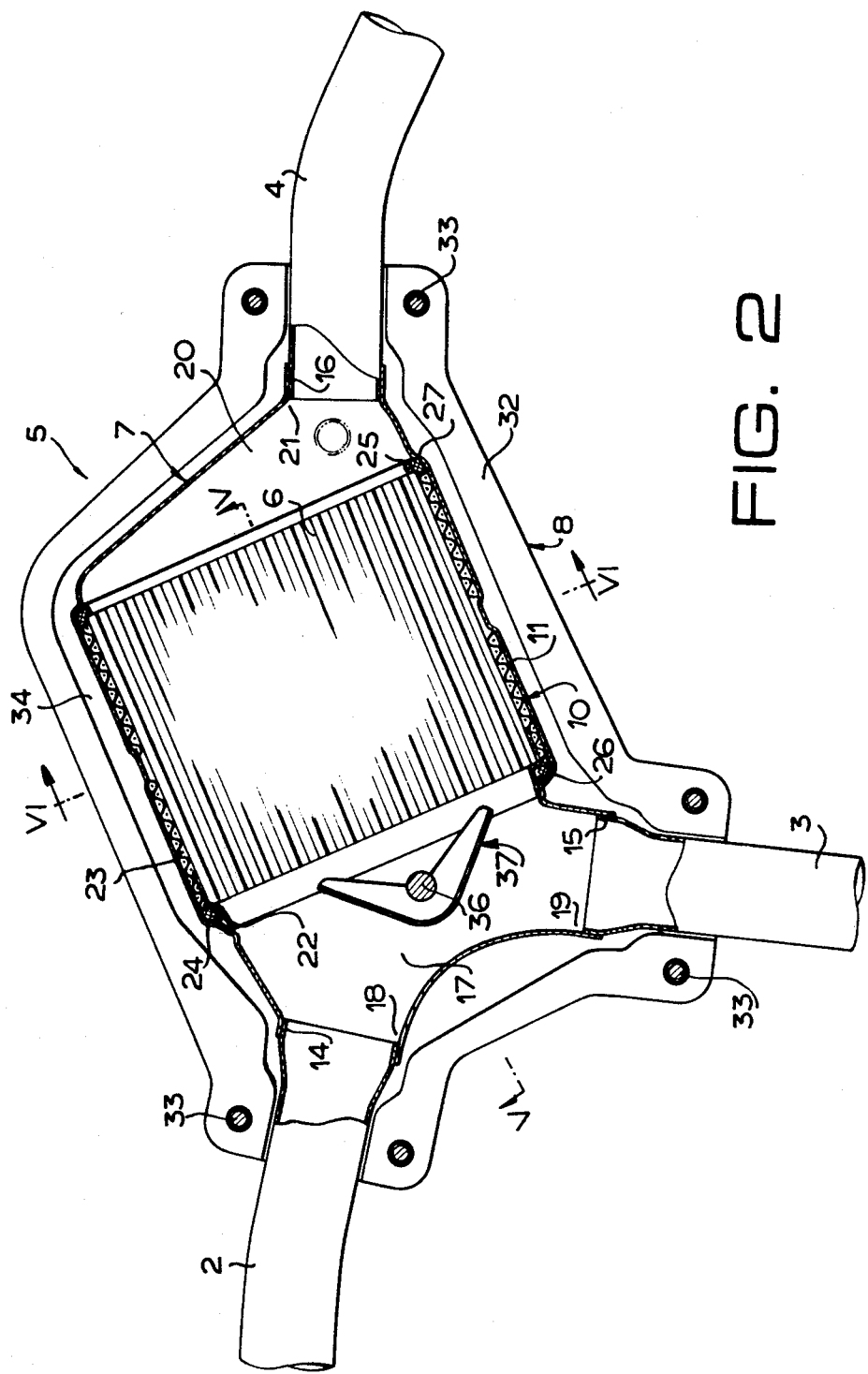
FIG. 2 is a sectional plan view of the catalytic converter shown in FIG. 1.
Figure 7:
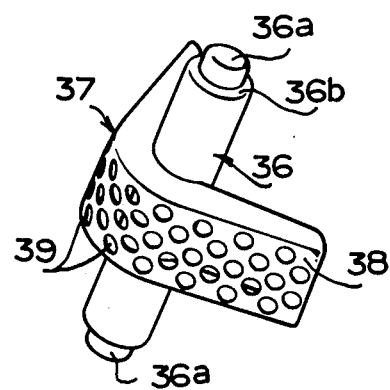
FIG. 7 is a perspective view showing a diffuser.
Figure 8:
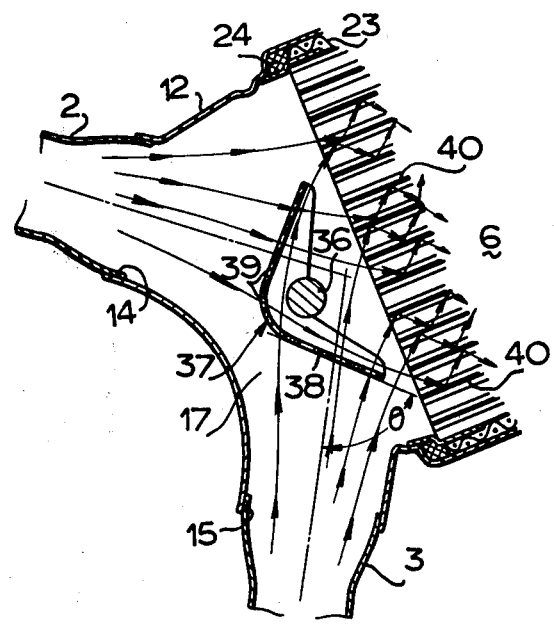
FIG. 8 is a sectional plan view of an inlet chamber portion.

The catalytic converter 5 comprises a monolithic catalyst element 6 provided in a cylindrical shell 7 having an oval cross section and a protective cover 8, as shown in FIGS. 2 to 6. The catalyst is a monolithic three-way catalyst, but other types of catalyst may be used as the converter. The shell 7 comprises a pair of half shells 9 and 10 each of which is made by pressing stainless steel plate. Each of the half shells 9 and 10 has a body shell 11, a tapered inlet shell 12, and a tapered outlet shell 13. The inlet shell 12 has a pair of semicircular inlet portions 14 and 15, and the outlet shell 13 has a semicircular outlet portion 16. Thus, by joining both half shells 9 and 10 together, a catalyst chamber is formed by the body shells 11, an inlet chamber 17 is formed by the tapered inlet shells 12, and inlet ports 18 and 19 are formed by the semicircular inlet portions 14 and 15. Further, an outlet chamber 20 is formed by the tapered outlet shells 13 and an outlet port 21 is formed by the semicircular outlet portions 16. Each axial line of the inlet ports 18 and 19 forms an acute angle with the front end plane of the catalyst element, as shown in FIGS. 2 and 8, so that the axial lines of both inlet ports cross each other in the inlet chamber 17 at a central position near the front end of the catalyst element 6. Further, the outlet port 21 is biased from the axial line of the catalyst chamber and makes an angle with the axial line. The monolithic catalyst element 6 engages an annular rim 22 at the front end portion and a wire mesh 23 and damper meshes 24 and 25 are provided between the cylindrical shell 7 and the periphery of the rim and catalyst element. The damper mesh 24 is disposed between the shoulder 26 of the cylindrical shell 7 and the annular rim 22 and the damper mesh 25 is disposed between the shoulder 27 of the shell and the end of the catalyst element. Thus, the monolithic catalyst element 6 is resiliently maintained by the wire mesh 23 and damper meshes 24 and 25, so that movement of the catalyst emember is prevented. Further, the damper mesh 24 and the annular rim 22 serve as a sealing device for preventing the exhaust gases from passing through the space between the catalyst element the the inner wall of the shell 7.

The upstream exhaust pipes 2 and 3 engage the inlet ports 18 and 19 and are welded thereto, respectively and the downstream exhaust pipe 4 engages the outlet port 21. The converter shell 7 is covered by the protective cover 8 comprising half members 31 and 32. The half members 31 and 32 are joined at the portion surrounding the exhaust pipes 2, 3 and 4 and secured thereto by bolts 33. Peripheral edges of both half members 31 and 32 are disposed apart from each other and there a space 34 is provided between the cover 8 and the shell 7. Thus, air can enter the space 34 from the gap 35 between the edges of the half members 31 and 32, thereby cooling the converter during the operation.

In accordance with the present invention, there a reinforcement stud 36 is provided in the inlet chamber 17 and a diffuser 37 is secured to the stud. The stud 36 has reduced diameter portions 36a and shoulders 36b at the opposite ends. Each reduced diameter portion 36a engages a hole of the half shell 9 or 10 and the shoulder 36b supports the half shell, and the portion 36a and the half shell are welded each other. Thus, the half shells 9 and 10 may be assembled accurately into a cylindrical shell having a predetermined dimension. Further, the stud 36 is positioned at a point which is at some distance in the upstream direction from the crossing point of the axial lines of the inlet ports 18 and 19 as shown in FIG. 8.

The diffuser 37 has V-shaped cross section and comprises V-shaped diffusing plate 38. The diffuser 37 is arranged such that axial line of each inlet port makes an angle $\theta$ of incidence with the front plane of the diffusing plate 38, thereby deflecting the gas flow towards the side of the catalyst element far from the inlet port. The diffusing plate 38 has a plurality of perforations 39 and the total area of the perforations are determined so that about half the exhaust gases can pass through. Further, the diffusing plate has a height of about half the diameter of the gas flow passage, which is a preferable dimension for obtaining an effective diffusion of the gases with a small back pressure.

In operation, exhaust gases enter the inlet chamber 17 from the inlet ports 18 and 19 alternately in accordance with the firing order of the engine. About half the amount of the exhaust gases pass through the perforations 39 of the diffusing plate 38 and the remainder are deflected by the plate having an angle $\theta$ of incidence toward the peripheral area of the inlet chamber. Thus, the exhaust gases can be uniformly distributed to the catalyst element. In addition, since each axial line of the inlet ports makes an angle with the end plane of the catalyst element 6, the exhaust gases collide with the wall 40 of each passage of the catalyst element 6 as shown in FIG. 8. Therefore, the exhaust gases pass through each passage of the catalyst element in a zigzag flow pattern as shown by arrows in FIG. 8. The zigzag flow pattern increases the residence time of the gases in the catalyst element which enhances the catalytic reaction in the converter as compared with a conventional converter in which the gases pass straight through the passage.

Thus, in accordance with the present invention, the exhaust gases diffuse in the inlet chamber so as to be uniformly distributed to in the catalyst element and pass through the catalyst element at a reduced flow rate, whereby the reaction of the noxious components sufficiently takes place in the catalyst element to reduce the amount of the noxious components to the required level.

Further, the half shells 9 and 10 are supported in the desired position by the stud 36, whereby the cylindrical shell may be manufactured with accuracy and high rigidity.

What is claimed is:

1. Apparatus for purifying the exhaust gases of internal combustion engines of automotive vehicles comprising
   a pair of upstream exhaust pipes adapted to communicate with exhaust ports of an internal combustion engine,
   a catalytic converter communicating with said exhaust pipes, and
   a downstream exhaust pipe communicating with said catalytic converter,
   said catalytic converter comprising a cylindrical shell made of half shells, said cylindrical shell having an oval cross-section, said cylindrical shell forming an inlet chamber, a catalyst chamber and an outlet chamber, a monolithic catalyst element in said catalyst chamber, a reinforcement stud provided in a central portion of said inlet chamber between said half shells, said inlet chamber having a pair of inlet ports engaged with said upstream exhaust pipes, said inlet ports being so arranged that axial lines of the inlet ports cross each other in said inlet chamber at a position near, but upstream of, the upstream facing end of said monolithic catalyst element, and a diffuser means secured to said stud, said diffuser means comprising a V-shaped diffusing plate having a plurality of perforations and said diffusing plate being so arranged that the axial line of each inlet port makes an angle of incidence with a respective upstream facing plane of the plate, and said diffusing plate having a height of about a half of the diameter of the gas flow passage in the inlet chamber, whereby at least a portion of the exhaust gases from said inlet ports pass around said diffusing plate in a substantially unimpeded manner so as to prevent excessive back pressure.

2. The apparatus for purifying the exhaust gases in accordance with claim 1 wherein
   said stud is upstream of the crossing point position.

3. The apparatus for purifying the exhaust gases as set forth in claim 1, wherein
   said plurality of perforations has a total area such that about half the exhaust gases pass therethrough.

4. The apparatus for purifying the exhaust gases as set forth in claim 1, wherein
   said V-shaped diffusing plate has an apex pointing in a direction toward between said pair of inlet ports and free ends adjacent the upstream facing end of said monolithic catalyst element, the diffusing plate extending between the free ends over a substantial central portion of said facing end of said monolithic catalyst element, said upstream facing planes of said diffusing plate extend substantially a distance equal to the diameter of the inlet ports.

5. The apparatus for purifying the exhaust gases as set forth in claim 4, wherein
   said reinforcement stud has reduced diameter portions and shoulders at both ends thereof, said half shells are formed with holes, said reduced diameter portions engage in said holes and said shoulders support said half shells, and said diffusing plate is secured to a central portion of said reinforcement stud between said shoulders.

* * * * *